(12) United States Patent
Guemmer

(10) Patent No.: US 8,152,444 B2
(45) Date of Patent: Apr. 10, 2012

(54) FLUID INJECTOR NOZZLE FOR A MAIN FLOW PATH OF A FLUID FLOW MACHINE

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 531 days.

(21) Appl. No.: 12/382,692

(22) Filed: Mar. 20, 2009

(65) Prior Publication Data

US 2009/0238688 A1    Sep. 24, 2009

(51) Int. Cl.
*F03B 11/00*    (2006.01)
(52) U.S. Cl. ........................ 415/58.5; 415/58.7
(58) Field of Classification Search ............ 415/58.5
See application file for complete search history.

(56) References Cited

U.S. PATENT DOCUMENTS

| | | | |
|---|---|---|---|
| 2,828,608 A * | 4/1958 | Cowlin et al. | 60/799 |
| 3,238,718 A * | 3/1966 | Hill | 60/39.37 |
| 3,685,741 A | 8/1972 | O'Sickey | |
| 4,097,188 A | 6/1978 | Forster | |
| 4,373,325 A * | 2/1983 | Shekleton | 60/776 |
| 4,870,826 A * | 10/1989 | Daguet et al. | 60/751 |
| 4,891,936 A * | 1/1990 | Shekleton et al. | 60/804 |
| 4,989,404 A * | 2/1991 | Shekleton | 60/804 |
| 5,001,895 A | 3/1991 | Shekleton et al. | |
| 5,205,117 A | 4/1993 | Shekleton et al. | |
| 5,214,911 A * | 6/1993 | Shekleton | 60/778 |
| 5,317,864 A * | 6/1994 | Shorb et al. | 60/804 |
| 6,071,076 A | 6/2000 | Ansari et al. | |
| 6,261,053 B1 | 7/2001 | Anderson et al. | |
| 7,052,231 B2 | 5/2006 | Wilusz | |
| 7,565,794 B2 | 7/2009 | Eroglu et al. | |
| 7,654,088 B2 | 2/2010 | Shafique et al. | |

FOREIGN PATENT DOCUMENTS

| | | |
|---|---|---|
| DE | 102005015152 | 10/2006 |
| EP | 700498 | 3/1996 |
| EP | 1205635 | 5/2002 |
| WO | 9428351 | 12/1994 |
| WO | 95/16881 | 6/1995 |

OTHER PUBLICATIONS

German Search Report dated Mar. 20, 2008 from related foreign application.
U.S. Appl. No. 12/385,461, filed Apr. 8, 2009.

* cited by examiner

*Primary Examiner* — Matthew Landau
*Assistant Examiner* — Robert Bachner
(74) *Attorney, Agent, or Firm* — Timothy J. Klima; Shuttleworth & Ingersoll, PLC

(57) ABSTRACT

A fluid flow machine includes an annulus duct formed between a casing and a rotor drum, which is rotatable about a machine axis. At least one row of rotor blades is arranged in the annulus duct, with the latter forming a main flow path and with at least one fluid injector nozzle being arranged in the area of a wall of the casing and/or of the rotor drum. At least part of the injector nozzle protrudes into the main flow path and is provided for the generation of a jet which is tangentially directed to the wall of the main flow path.

18 Claims, 8 Drawing Sheets

Section Z-Z

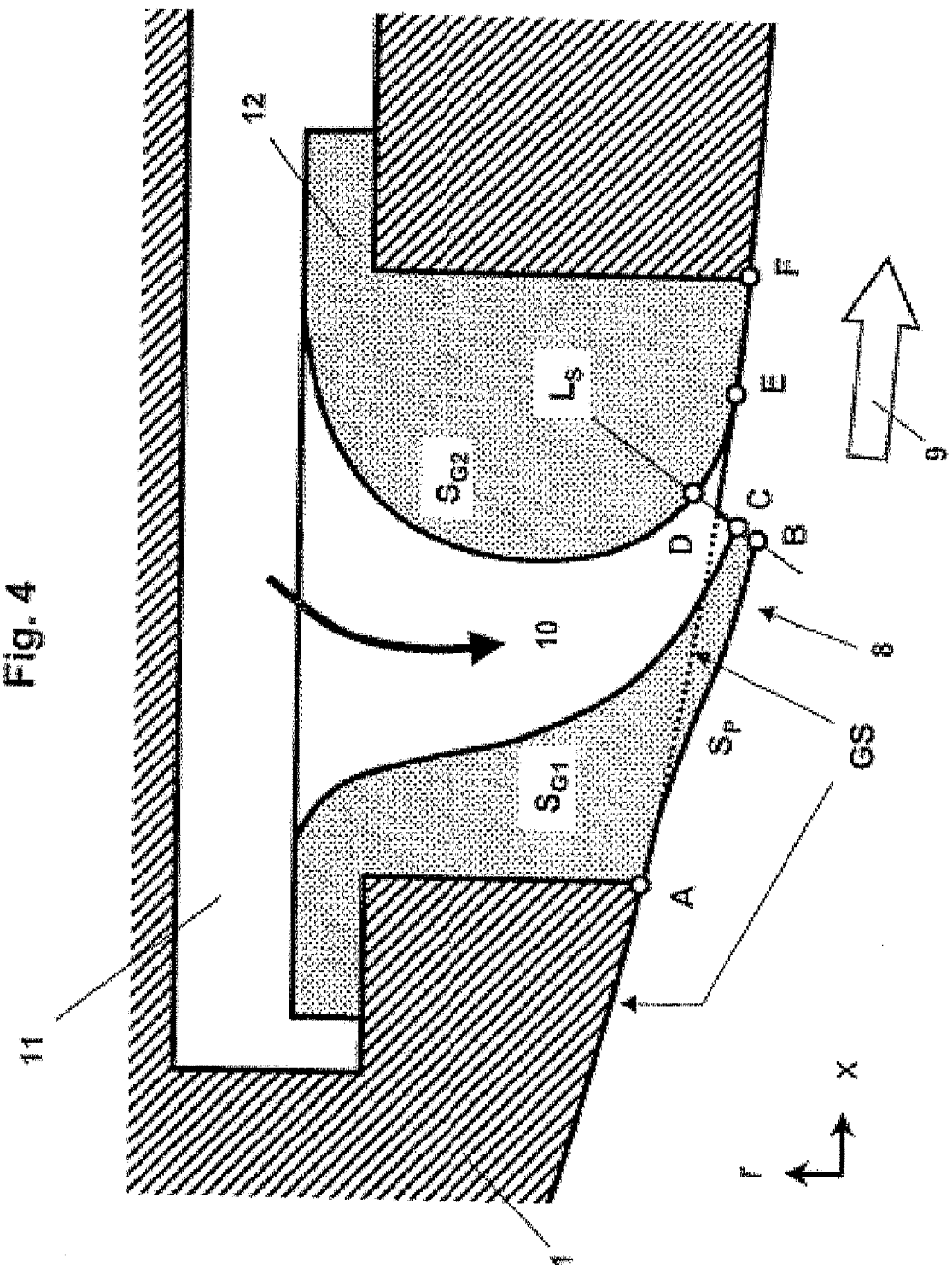

Fig. 6
Section Y-Y
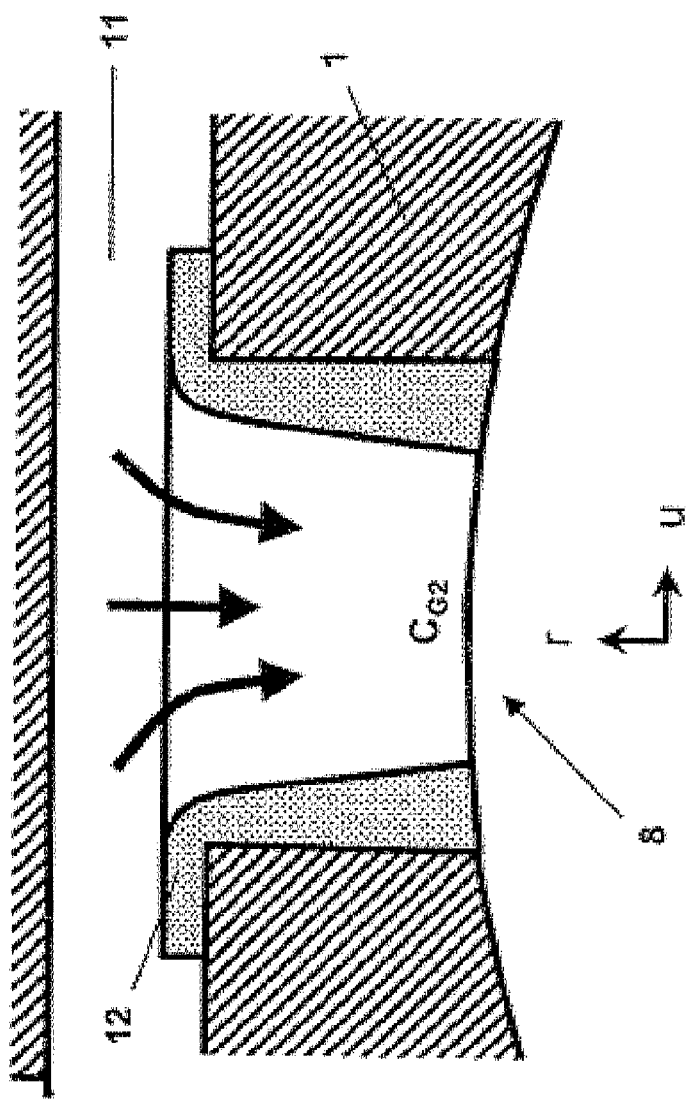
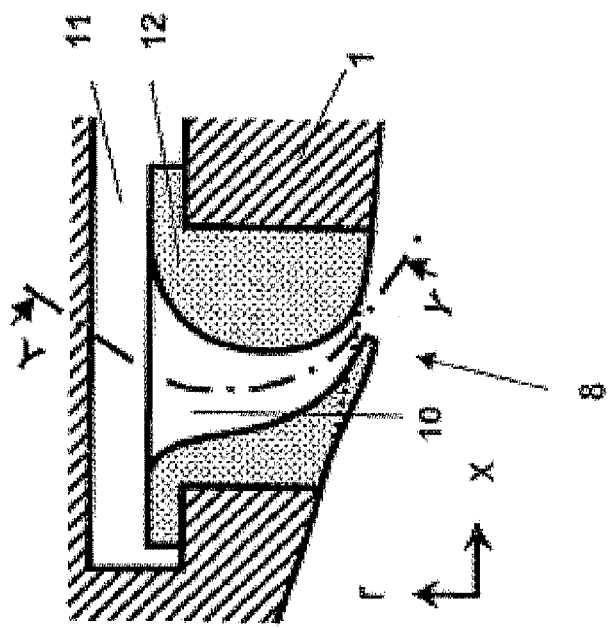

FLUID INJECTOR NOZZLE FOR A MAIN FLOW PATH OF A FLUID FLOW MACHINE

This application claims priority to German Patent Application DE102008015207.2 filed Mar. 20, 2009, the entirety of which is incorporated by reference herein.

This invention relates to an injector nozzle of a fluid flow machine.

The present invention relates to fluid flow machines, such as blowers, compressors, pumps and turbines of the axial, semi-axial and radial type. The working medium or fluid may be gaseous or liquid.

The fluid flow machine may include one or several stages, each of which having a rotor and a stator.

The rotor includes a number of blades which are connected to the rotating shaft of the fluid flow machine. The rotor may be shrouded or have a free blade end on the casing. The stator includes of a number of stationary vanes which, on the casing side, have a fixed blade end.

The fluid flow machine may be provided with a special type of stator upstream of the first rotor, a so-called inlet guide vane assembly.

At least one stator or inlet guide vane assembly, instead of being fixed, can be variable to change the angle of attack. A spindle accessible from the outside of the annulus duct can, for example, accomplish such a variation.

The fluid flow machine may, in a special form, be provided with at least one row of variable rotors.

The aerodynamic loadability and the efficiency of fluid flow machines such as blowers, compressors, pumps, fans and turbines, is limited in particular by the growth and the separation of boundary layers in the rotor blade tip area near the casing wall. The state of the art provides solutions to this problem only to a limited extent. The numerous concepts existing for fluid supply to the turbine blades essentially provide for surface cooling, not for energizing the boundary layers.

Furthermore, concepts are known for compressor rotors for the supply of air on hub and casing by axially-symmetric slots to influence the wall boundary layers there.

Finally, concepts exist in which rotors in a casing vicinity are blown at by individual injector nozzles to favorably influence the radial gap flow there.

While the general concept of influencing the boundary layers by insufflation or fluid supply is contained in the state of the art, the known solutions are effective to only a limited extent and very restricted as regards their practical applicability. Therefore, applications of fluid flow machines above the laboratory level do not contain any of these concepts. Important for the implementability and effectivity of fluid introduction into the flow path of a fluid flow machine is the shape and positioning of the injector nozzle. In this respect, there is a lack of practicable solutions.

Figure 1:
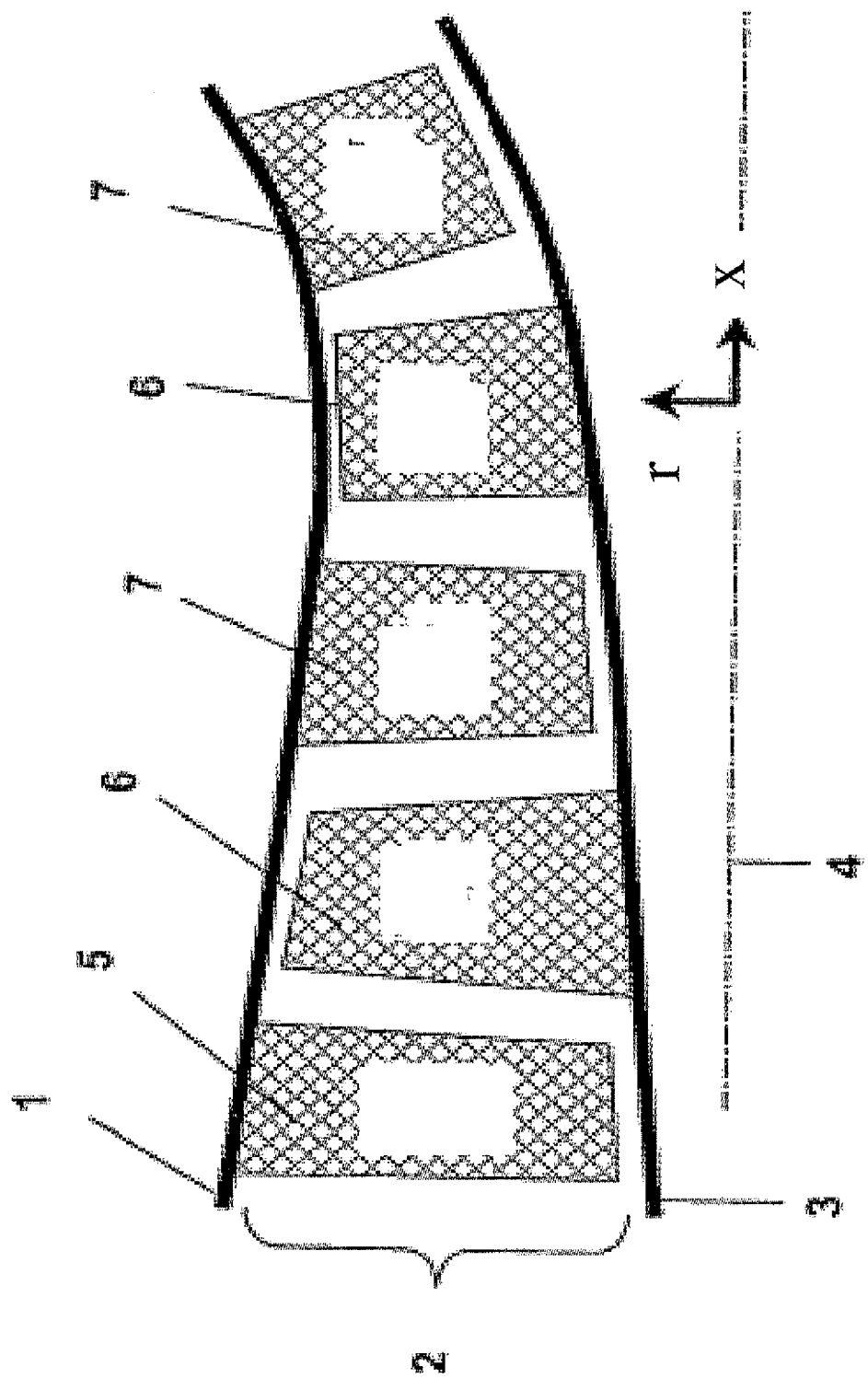

FIG. 1 schematically shows a fluid flow machine on the example of a compressor including an annulus duct 1 which is confined inwardly by a hub contour (rotor drum/hub 3) and outwardly by a casing contour (casing 1) and is provided with a number of rotor blade rows and stator vane rows within the annulus duct 2 (rotor blades 6 and stator vanes 7). Non-bladed spaces exist between the blade rows.

Figure 2:
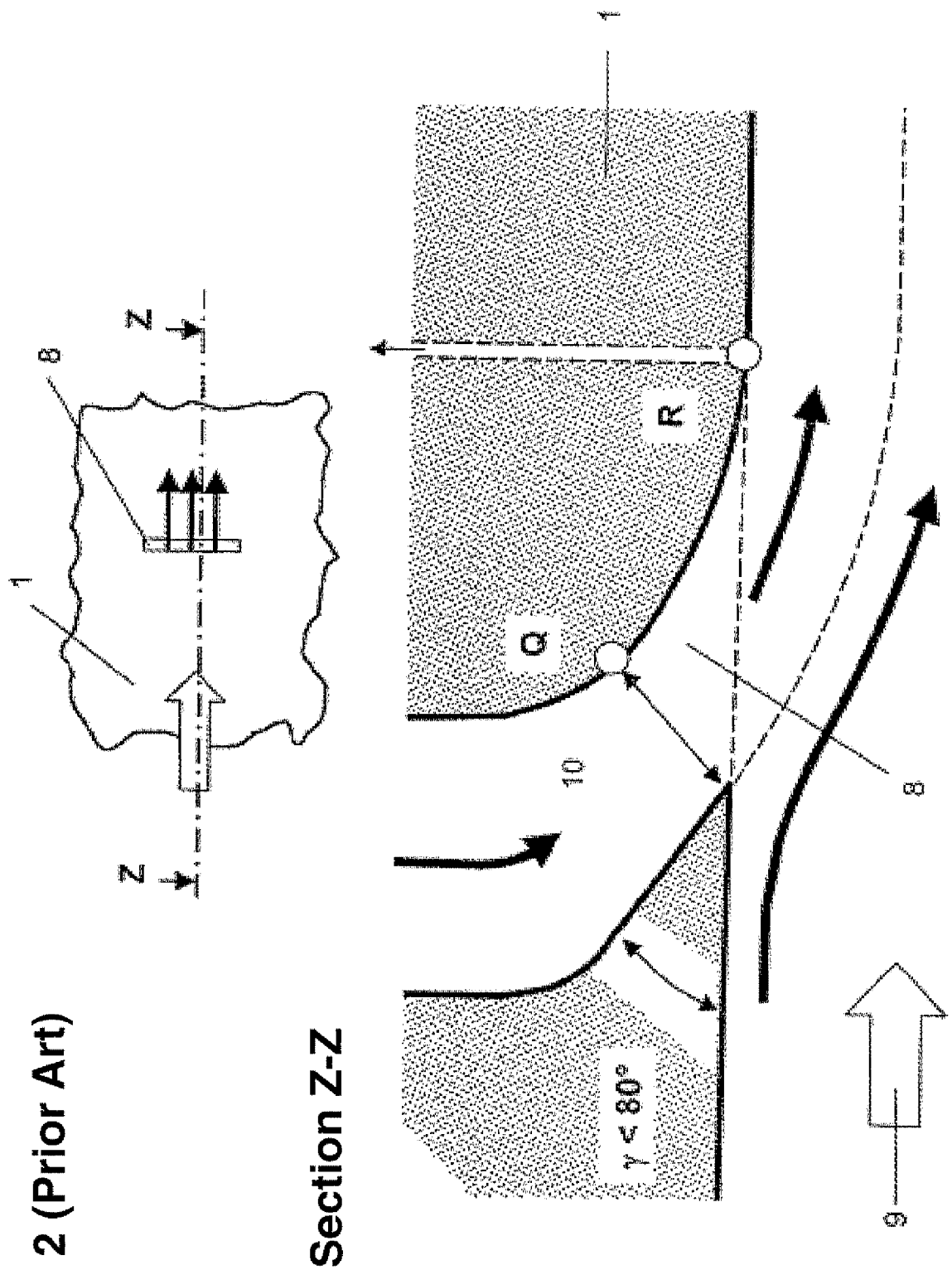

As indicated by the large arrow in FIG. 2, the fluid flow machine is flown from the left-hand side. Introduction of fluid via one or more suitable injectors is advantageous at any point of the annulus duct boundaries (wetted hub and casing surfaces). Specification DE 10 2004 030 597 A1 proposes special injector nozzles provided on the stator, in particular special, non-protruding injector nozzles, see FIG. 2.

Injector nozzles according to the state of the art, and these include, in particular, non-protruding nozzles, lead in operation to a marked disturbance of the approaching flow and cause noticeable pressure losses already during the generation of the fluid jet. With the conventional design related to the state of the art, severe parasitic leakage flows occur which also impair the flow in the fluid flow machine.

A similar state of the art is shown in specification U.S. Pat. No. 5,217,348.

A broad aspect of the present invention is to provide a fluid injector nozzle of the type specified at the beginning above which, while avoiding the disadvantages of the state of the art, enables highly efficient boundary layer influencing.

More particularly, the present invention therefore provides a fluid injector nozzle for the application in fluid flow machines, with the nozzle duct of the injector having an aerodynamically particularly favorable and low-disturbing shape.

The present invention accordingly provides for a special arrangement of a fluid injector nozzle for application in fluid flow machines by which a highly efficient rim jet generation at the confining walls of the main flow path is obtained.

Figure 5:
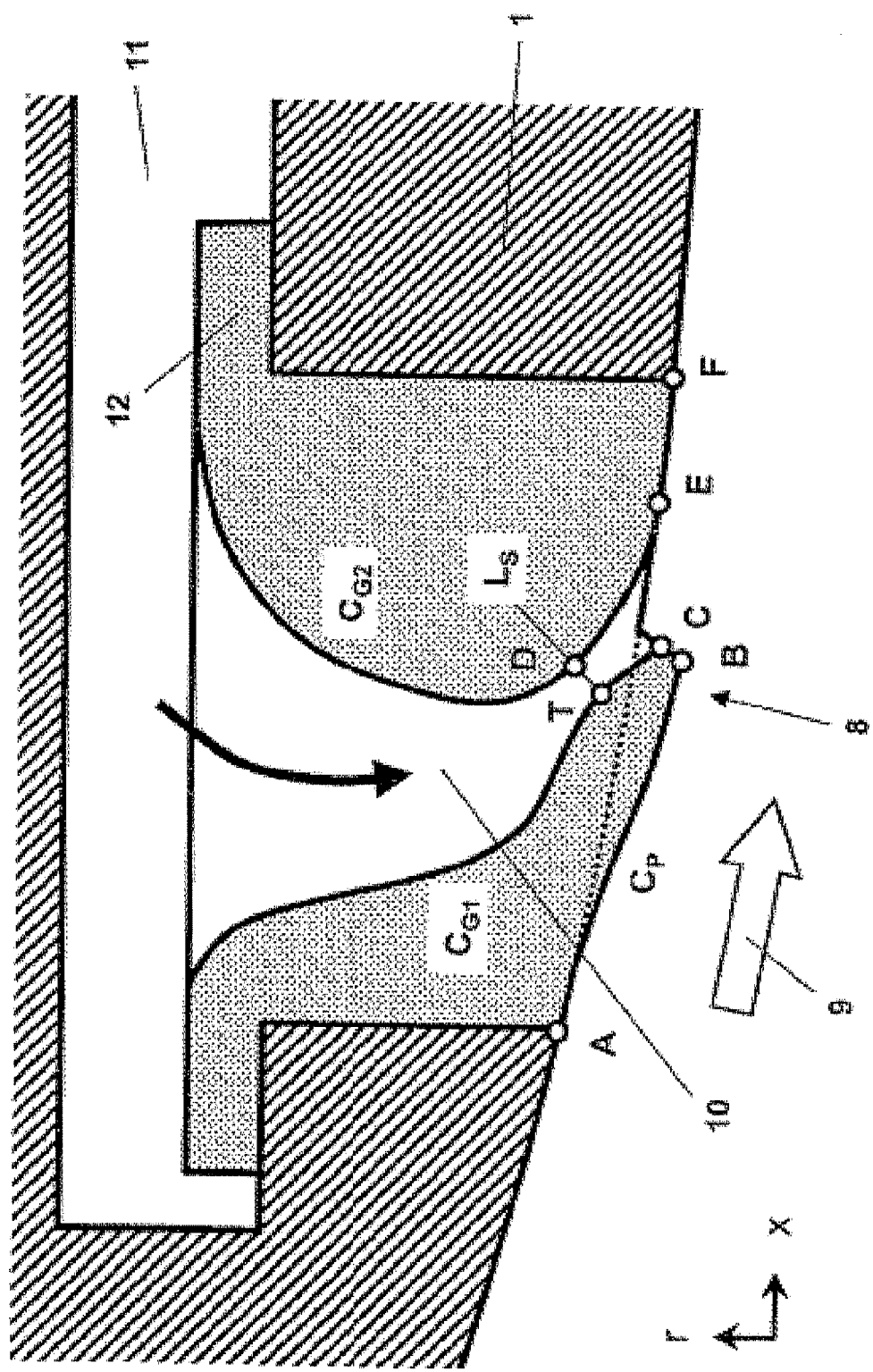
Figure 7:
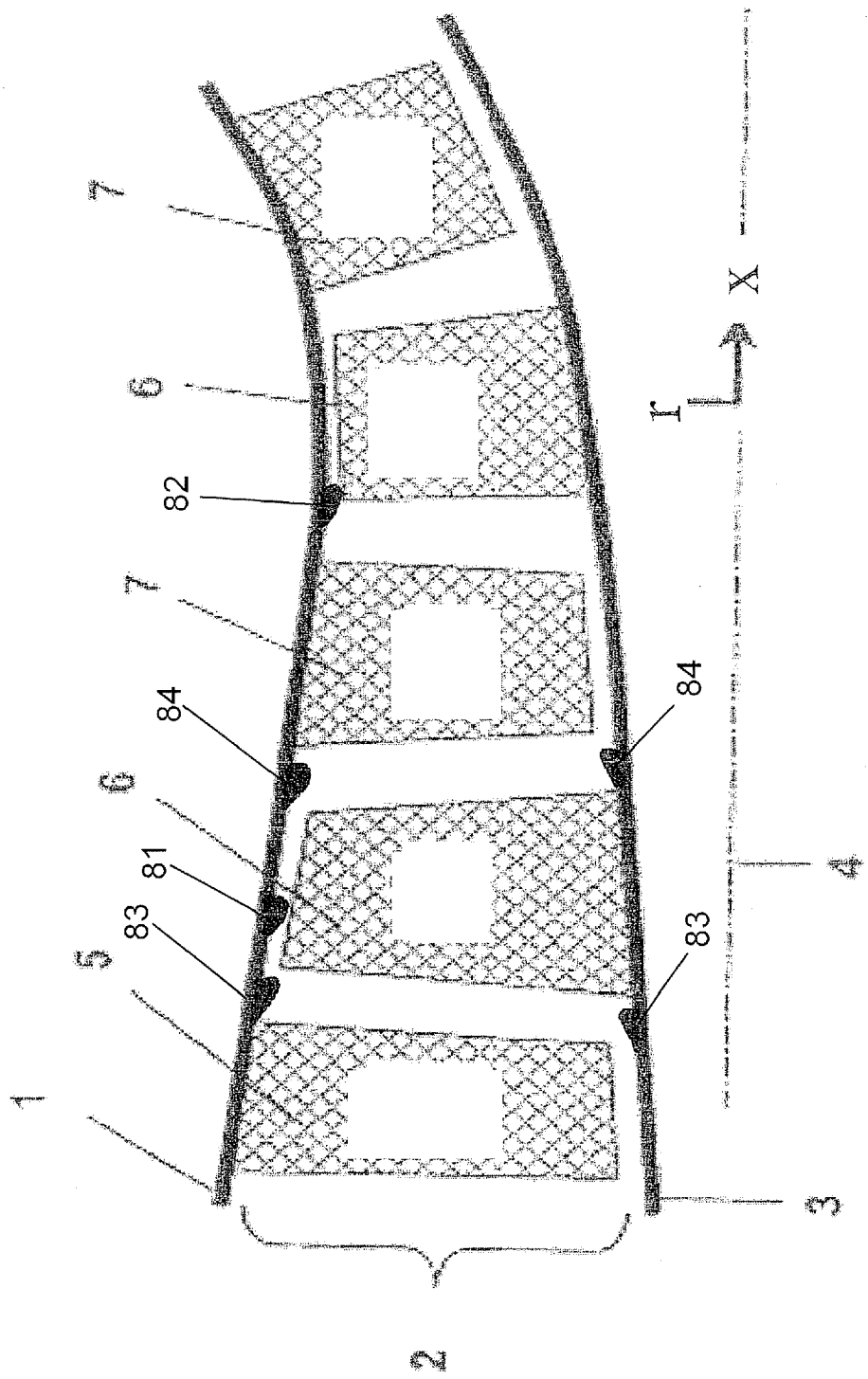

The present invention is more fully described in light of the accompanying drawings showing preferred embodiments. In the drawings, FIG. 1 (Prior Art) is a schematic representation of a fluid flow machine on the example of a compressor in accordance with the state of the art, FIG. 2 (Prior Art) shows an injector nozzle in accordance with the state of the art, FIG. 3a is a top view of fluid injector nozzles in accordance with the present invention, FIG. 3b is a perspective view of fluid injector nozzles in accordance with the present invention, FIG. 4 shows a fluid injector nozzle in accordance with the present invention in section Z-Z as per FIG. 3a featuring a throat at the jet exit, and FIG. 5 shows a fluid injector nozzle in accordance with the present invention in section Z-Z as per FIG. 3a featuring a throat within the jet duct, FIG. 6 shows a fluid injector nozzle in accordance with the present invention in section Y-Y; and FIG. 7 shows various locations of fluid injector nozzles.

FIG. 2 (Prior Art) shows an injector nozzle 8 according to the state of the art. The upper, small portion of the Figure shows part of the flow path surface of a fluid flow machine. Fluid issues onto the surface through an injector nozzle 8 depicted as an opening.

Section Z-Z is shown in enlarged representation in the bottom portion of the Figure. It shows the form and arrangement of the injector nozzle 8. The injector nozzle 8 is designed such that it protrudes nowhere into the flow path. This leads to significant disturbances of the flow field when the nozzle is in operation and fluid flows from the injector nozzle 8 into the gas path of the fluid flow machine. A bold arrow indicates a main flow 9 in the fluid flow machine, the thin arrows indicate courses of local flow. Further, due to the sharp curvatures of the nozzle contour, the fluid is badly conducted on its way into the flow path of the fluid flow machine, although the throat of the injector nozzle 8 is disposed close to the exit of the latter.

Figure 3A:
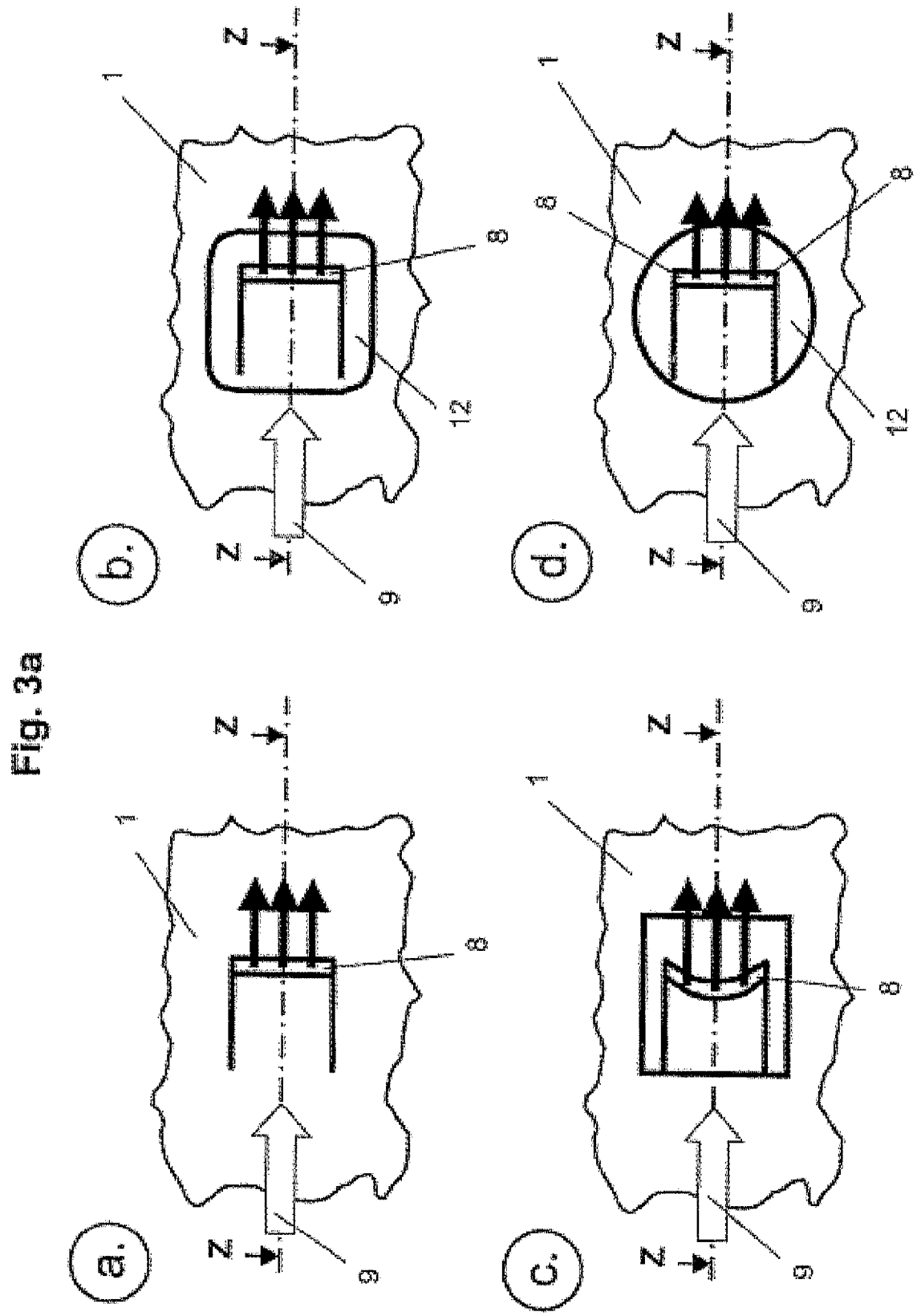
Figure 3B:
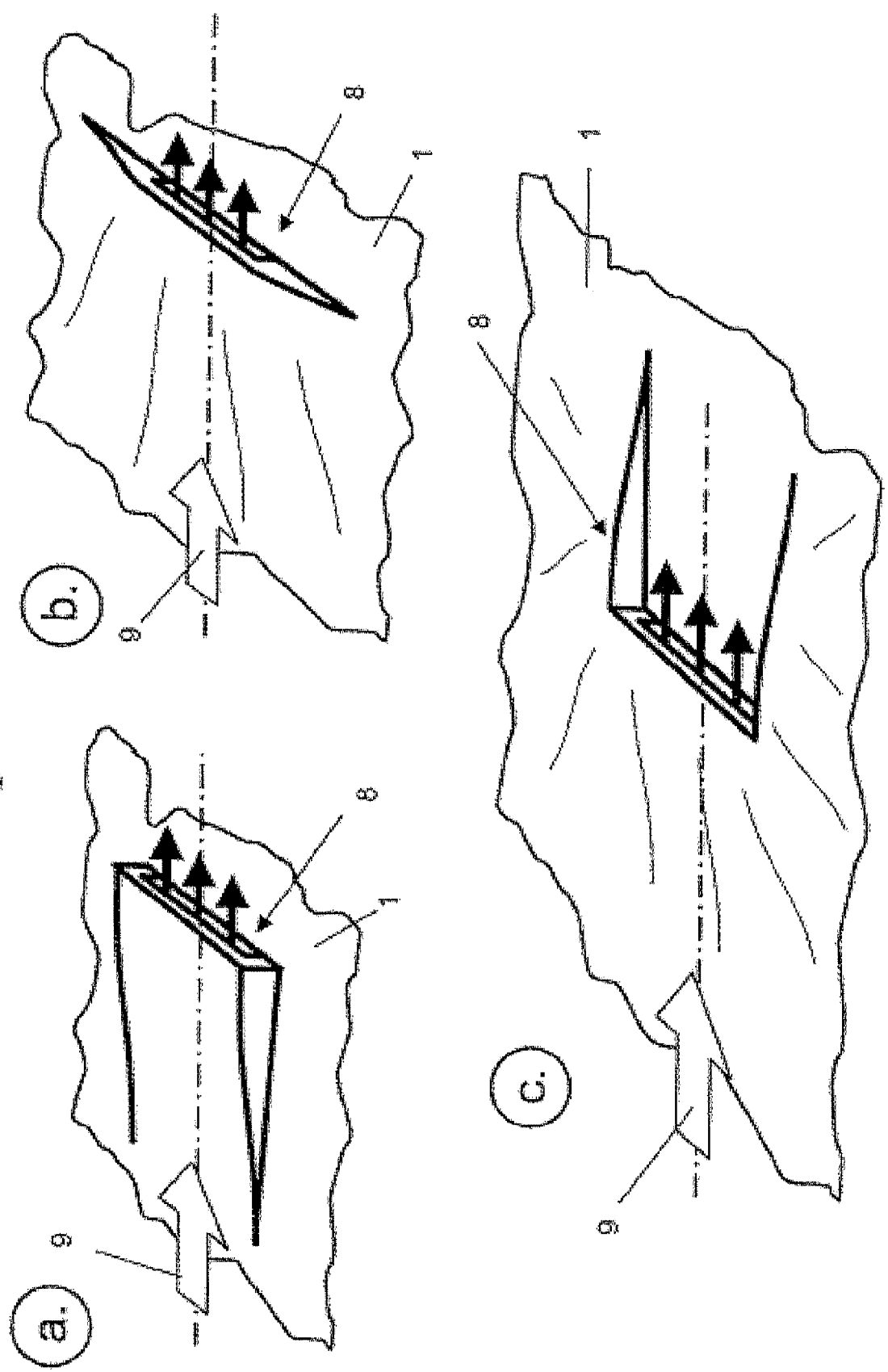

FIG. 3a shows four different examples or configurations of the fluid injector nozzle 8 according to the present invention. Parts a, b, c and d of FIG. 2 show part of the flow path surface of a fluid flow machine. On part of the flow path surface an injector nozzle 8 is provided which, in accordance with the present invention, can extend over the entirety or a section of the circumference of the flow path of the fluid flow machine. A bold arrow indicates the main flow 9 in the fluid flow machine, the thin arrows indicate the fluid issuing from the injector nozzle 8.

In all variants according to the present invention, the injector nozzle 8 is formed such that it protrudes into the main flow path 9 of the fluid flow machine, thereby enabling the flow to be favorably conducted prior to its entry into main flow path 9 and producing only minor disturbances in the flow field as the injector fluid meets the main flow 9.

The injector nozzle 8 according to the present invention can be disposed directly in the main flow path wall or in a separate component inserted in the main flow path wall.

Section Z-Z according to FIGS. 4 and 5 is shown in enlarged representation. When the main flow path wall is evolved into the drawing plane as a plane surface, the exit slot of the injector nozzle will, in accordance with the present invention, extend rectilinearly or also curved, or, if applicable, have the form of a circular arc.

FIG. 3b shows in perspective view two shapes of the contour in the area of the nozzle exit, which are possible in accordance with the present invention.

In FIG. 3b part a), the protruding injector nozzle 8 has two side flanks oriented approximately with the main flow direction. Here, no edges are provided downstream of the nozzle exit opening.

FIG. 3b part b) shows a configuration of the injector nozzle 8 with contours running out smoothly in the direction of the main inflow, i.e. without edges directed in the main flow. In this configuration, a step surface is provided only in the plane of the nozzle exit opening.

FIG. 3b part c) shows a configuration of the injector nozzle 8 with contours running out smoothly in all directions, i.e. without edges directed in the main flow. In this configuration, two lateral flanks are provided downstream and at the side of the nozzle exit opening which guide the exiting nozzle jet for a short route.

FIG. 4 shows an arrangement of the fluid injector nozzle according to the present invention in section Z-Z in the meridional plane of the fluid flow machine set up by the axial coordinate x and the radial coordinate r.

The injector fluid is supplied to the main flow path 9 from the side in such a manner that a jet is produced which is directed as tangentially as possible along the main flow wall. The main flow 9 of the fluid flow machine is indicated by the large arrow. Given first is the contour of the main flow path GS which usually is rotationally-symmetric to the axis (machine axis) of the fluid flow machine. In the area in which the injector nozzle 8 protrudes into the main flow path, the latter is shown as a dotted line.

The injector nozzle 8 is supplied with fluid from a flow supply chamber 11 provided within the wall structure, see thin arrow. The injector nozzle 8 is confined by the contours SG1 and SG2.

Advantageous are a cross-sectional area of the flow which continuously decreases through the injector nozzle 8 as well as a round and edge-free shape of the entry of the nozzle duct 10. Two limiting points, A and F, exist upstream and downstream of the injector nozzle 8 which are of particular importance if the injector nozzle 8 according to the present invention is not arranged immediately in the main flow path wall but in a separate component (injector nozzle body 12), as shown in the representation of FIG. 4.

At these points A and F, the main flow-wetted surfaces of the injector element and the main flow path wall border on each other. Between a further point E (nozzle transition point) and the point F the contour of the injector here coincides with the contour of the main flow path wall at other circumferential positions.

The final point of the nozzle contour SG1 in flow direction is the nozzle end point C. If a perpendicular LS is erected on the opposite nozzle contour SG2 and passed through the nozzle end point C, the base point D is obtained which is situated on SG2. The nozzle end point C and the base point D define the exit cross-section of the injector nozzle 8. According to the present invention, the nozzle end point C is situated in the area of the main flow, i.e. on a part of the injector protruding beyond the main flow path contour GS.

The injector nozzle 8 in accordance with the present invention will protrude particularly far if the base point D takes the position of the transition point E. If the injector nozzle 8 is disposed in a separate component and a limiting point F exists, the transition point E can coincide with the limiting point F.

According to the present invention, it is particularly favorable if the distance between the points E and F is at least three times the height of the nozzle final cross-section, i.e. the distance between the points C and D.

Furthermore, it is particularly advantageous according to the present invention to provide, at the transition point E, a tangential transition, not a sharp contour bend, between the injector contour SG2 and the main flow path contour GS.

Furthermore, it is particularly advantageous according to the present invention to provide, at the limiting point A, a tangential transition, not a sharp contour bend, between the injector outer contour SP and the main flow path contour GS.

Furthermore, it is particularly advantageous according to the present invention to provide, at the limiting point F, a tangential transition, not a sharp contour bend, between the injector outer contour (part of SG2) and the main flow path contour GS.

Moreover, it is particularly favorable according to the present invention to provide a contour inclination at the nozzle corner point B, which essentially agrees with the inclination of the main flow path contour GS at adjacent position, with the nozzle corner point B coinciding with the nozzle end point C in the event of a pointed edge, which also corresponds to the present invention.

Similar to FIG. 4, FIG. 5 shows an arrangement of the fluid injector nozzle according to the present invention in section Z-Z.

The injector fluid is supplied to the main flow path from the side in such a manner that a jet is produced which is directed as tangentially as possible along the main flow wall. The injector nozzle 8 is supplied with fluid from a flow supply chamber SC provided within the wall structure, see thin arrow. The injector nozzle 8 is confined by the contours SG1 and SG2, and, if the flow velocities in the injector nozzle 8 are high, it can be advantageous, as shown in the example, to arrange the throat of the injector nozzle 8 at a position in the interior of the injector nozzle 8, not at the final cross-section. In this case, the points T and D indicating the throat area are obtained with a perpendicular LS erected on the nozzle contour CG2.

FIG. 6 shows an arrangement of the fluid injector nozzle 8 according to the present invention in a curved section Y-Y through the injector nozzle 8. Also in this section, it is particularly advantageous according to the present invention to provide a decreasing width of the nozzle duct through the injector nozzle 8 as well as a round and edge-free shape of the entry of the nozzle duct.

With the advantageous variants according to the present invention, it is particularly favorable, if the flow duct of the fluid injector nozzle is connected to at least one fluid supply chamber provided within the components forming the main flow path, that the fluid injector nozzle produces a jet which is directed essentially tangentially along the main flow path wall, and that part of the exit cross-section of the fluid injector nozzle in at least one nozzle section considered protrudes beyond the contour of the confining main flow path wall into the main flow path, with the nozzle having the following characteristics:
- a.) an upstream limiting point A
- b.) a downstream limiting point F
- c.) a nozzle corner point B and a nozzle end point C of which at least one marks a portion of the injector nozzle protruding beyond the contour of the main flow path wall
- d.) a nozzle transition point E
- e.) a nozzle end point C and a base point D which mark the nozzle exit cross-section
- f.) a nozzle contour SG1 which terminates at the nozzle opening at nozzle end point C
- g.) a nozzle contour SG2 which transits at the nozzle transition point E into the contour of the main flow path
- h.) an injector outer contour SP which at least partly protrudes into the main flow path and is wetted by the main flow, if at least one fluid injector nozzle is provided on the entire circumference of the fluid flow machine, if at least one fluid injector nozzle is provided on part of the circumference of the fluid flow machine, if at least one fluid injector nozzle is provided at least partly in the bladed area between a blade leading-edge plane and a blade trailing-edge plane (at 81, FIG. 7) or at least partly within at least one blade passage (at 82, FIG. 7), respectively, if at least one fluid injector nozzle is provided at least partly in the unbladed area, i.e. upstream of a blade leading-edge plane (at 83, FIG. 7) or downstream of a blade trailing-edge plane (at 84, FIG. 7), respectively, it at least one fluid injector nozzle is provided in a separate component inserted in the main flow path wall, if the exit opening of at least one injector nozzle, in a perspective view perpendicular to the main flow path wall, is provided along a straight line, if the exit opening of at least one injector nozzle, in a perspective view perpendicular to the main flow path wall, is provided along a curved, if applicable also circularly arced line, if the flow cross-sectional area of at least one fluid injector nozzle continuously decreases in the direction of flow, if the throat area of at least one injector nozzle is provided at a position in the interior of the injector nozzle such that the nozzle cross-section upstream of the nozzle exit cross-section is first convergent and then divergent, if the wetted contour at the transition between at least one fluid supply chamber and at least one fluid injector nozzle, in at least one sectional plane through the fluid injector nozzle, is round and bend-free, if the distance between the points E and F on at least one fluid injector nozzle is at least three times the height of the nozzle final cross-section, i.e. the distance between the points C and D, if a bend-free, tangentially continuous transition is provided on at least one fluid injector nozzle at transition point E between the injector nozzle contour SG2 and the main flow path contour GS, if a bend-free, tangentially continuous transition of the contour is provided on at least one fluid injector nozzle on at least one of the limiting points A and F, if a contour inclination is provided on at least one fluid injector nozzle at nozzle corner point B which—when viewed perpendicular to the main flow direction—essentially agrees with the inclination at an adjacent position of the main flow path contour GS, if the nozzle exit edge of at least one fluid injector nozzle is completely pointed and, consequently, the nozzle end point C and the nozzle corner point B coincide with each other, if in three-dimensional view of the transitions between protruding nozzle exit opening and main flow path wall two side faces are provided which flank the nozzle opening in the upstream direction, if in three-dimensional view of the transitions between protruding nozzle exit opening and main flow path wall the contour around the nozzle exit opening is rounded and features no edges in the upstream direction, if in three-dimensional view of the transitions between protruding nozzle exit opening and main flow path wall the contour around the nozzle exit opening is rounded and features no edges, and two side faces are provided which flank the nozzle opening in the downstream direction.

| List of reference numerals | |
|---|---|
| 1 | Casing |
| 2 | Annulus duct |
| 3 | Rotor drum (hub) |
| 4 | Machine axis |
| 5 | Inlet guide vane assembly |
| 6 | Rotor/rotor blade |
| 7 | Stator/stator vane |
| 8 | Injector nozzle |
| 9 | Main flow/main flow path |
| 10 | Injector nozzle duct of curvature |
| 11 | Fluid supply duct |
| 12 | Injector nozzle body |
| 81 | Injector nozzle |
| 82 | Injector nozzle |
| 83 | Injector nozzle |
| 84 | Injector nozzle |

What is claimed is:

1. A fluid flow machine comprising:
a casing;
a rotor drum which is rotatable about a machine axis;
an annulus duct formed between the casing and the rotor drum and forming a main flow path for fluid;
at least one row of rotor blades attached to the rotor drum and positioned in the annulus duct for adding energy to the fluid in the main flow path of the annulus duct;
at least one fluid injector nozzle positioned along the annulus duct axially between a leading edge and a trailing edge of the rotor drum in at least one of an area of a wall of the casing and the rotor drum;
wherein, at least part of the fluid injector nozzle protrudes into the main flow path and generates a jet which is tangentially directed to the wall of the main flow path.

2. The fluid flow machine of claim 1, wherein the at least one injector nozzle is positioned along an entire circumference of the annulus duct.

3. The fluid flow machine of claim 1, wherein the at least one injector nozzle is positioned on only a part of the circumference of the annulus duct.

4. The fluid flow machine of claim 3, wherein the at least one injector nozzle is positioned at least partly in a bladed area between a blade leading-edge plane and a blade trailing-edge plane.

5. The fluid flow machine of claim 3, wherein the at least one injector nozzle is positioned at least partly within at least one blade passage.

6. The fluid flow machine of claim 3, wherein the at least one injector nozzle is positioned at least partly in an unbladed area upstream of a blade leading-edge plane or downstream of a blade trailing-edge plane in the annulus duct.

7. The fluid flow machine of claim 3, wherein the at least one injector nozzle is provided in a separate nozzle body, which is positioned in a wall of a main flow path.

8. The fluid flow machine of claim 7, wherein the injector nozzle is connected to a fluid supply chamber.

9. The fluid flow machine of claim 1, wherein an exit opening of the at least one injector nozzle is provided in a view perpendicular to the main flow along a straight line.

10. The fluid flow machine of claim 1, wherein the exit opening of the at least one injector nozzle is provided in a view perpendicular to the main flow along a curved line.

11. The fluid flow machine of claim 1, wherein the at least one injector nozzle is positioned at least partly in a bladed area between a blade leading-edge plane and a blade trailing-edge plane.

12. The fluid flow machine of claim 1, wherein the at least one injector nozzle is positioned at least partly within at least one blade passage.

13. The fluid flow machine of claim 1, wherein the at least one injector nozzle is positioned at least partly in an unbladed area upstream of a blade leading-edge plane or downstream of a blade trailing-edge plane in the annulus duct.

14. The fluid flow machine of claim 1, wherein the at least one injector nozzle is provided in a separate nozzle body, which is positioned in a wall of a main flow path.

15. The fluid flow machine of claim 2, wherein the at least one injector nozzle is positioned at least partly in a bladed area between a blade leading-edge plane and a blade trailing-edge plane.

16. The fluid flow machine of claim 2, wherein the at least one injector nozzle is positioned at least partly within at least one blade passage.

17. The fluid flow machine of claim 2, wherein the at least one injector nozzle is positioned at least partly in an unbladed area upstream of a blade leading-edge plane or downstream of a blade trailing-edge plane in the annulus duct.

18. The fluid flow machine of claim 2, wherein the at least one injector nozzle is provided in a separate nozzle body, which is positioned in a wall of a main flow path.

* * * * *